United States Patent [19]

Wixon

[11] 3,824,351

[45] July 16, 1974

[54] AUTOMATIC REPERTORY DIALER

[76] Inventor: Thomas G. Wixon, 1589 Blackstock Ave., Simi, Calif. 93065

[22] Filed: Aug. 21, 1972

[21] Appl. No.: 282,608

[52] U.S. Cl. .................. 179/90 B

[51] Int. Cl. .................. H04m 1/45

[58] Field of Search ......... 179/90 B, 90 AD, 90 BB; 235/61.11 C, 61.12 N

[56] References Cited

UNITED STATES PATENTS

| | | | |
|---|---|---|---|
| 2,508,953 | 5/1950 | Knutsen | 235/61.12 N |
| 3,204,046 | 8/1965 | Ries | 179/90 B |
| 3,305,644 | 2/1967 | Watanabe | 179/90 B |
| 3,566,043 | 2/1971 | Nicolas | 179/90 B |
| 3,621,205 | 11/1971 | Bradbury | 235/61.11 C |
| 3,705,960 | 12/1972 | Evans | 179/90 B |

*Primary Examiner*—Kathleen H. Claffy
*Assistant Examiner*—Jon Bradford Leaheey
*Attorney, Agent, or Firm*—Fulwider, Patton, Rieber, Lee & Utecht

[57] ABSTRACT

An automatic repertory dialer for use with a standard impulse telephone dialing system. A series of ten pulses for each digit to be dialed is generated by the motion of a programming belt on which is also stored, in coded form, a pluralty of telephone numbers which may be dialed. The number of pulses from each series of 10 pulses which are delivered to the dialing circuit is determined by the position of a mark on the programming belt. For each telephone number to be programmed, there are eleven positions on the programming belt associated with each digit of the telephone Number. These positions correspond to the number of pulses to be transmitted for that digit, from zero to 10. A mark in the appropriate position will cause that number of pulses to be transmitted for that particular digit. The circuit which accomplishes the dialing function is responsive to marks on the programming belt and transmits signals from the time the belt is in a first position to the time it assumes a second position, said positions being established by marks on the belt.

16 Claims, 8 Drawing Figures

PATENTED JUL 16 1974

3,824,351

SHEET 2 OF 3

AUTOMATIC REPERTORY DIALER

BACKGROUND OF THE INVENTION

The present invention relates generally to automatic telephone dialers and, more particularly, to repertory dialers for use in impulse type telephone dialing systems.

SUMMARY OF THE INVENTION

The present invention provides a programmable electromechanical system for generating a series of trains of pulses, each train having a preset number of pulses. Preselected numbers of the pulses from each train are gated through a controlled circuit. The system is manually initiated to produce one selected combination of trains of pulses from a plurality of preset combinations.

The presently preferred embodiment of the invention is utilized to automatically dial one of a number of prerecorded telephone numbers. The illustrated embodiment incorporates a motor driven thin flat endless paper or plastic belt on which is stored information enabling the dialer to select one of a number of telephone numbers. A plurality of rows of pulse recording areas running along the length of the belt are disposed across the width of the belt. Fixed sensors read the permanently recorded pulses which are common to all numbers to be dialed and moveable sensor, which can be aligned with any row containing information for a particular number to be dialed, reads the information about the particular number to be dialed.

The dialer can be made so as to have the capability of dialing any desired number of digits and provision is made for skipping digits if the particular number to be dialed has fewer digits than the capability of the unit.

The principle of the present invention can, of course, accomplish functions other than telephone dialing and can conveniently be used to perform any task which requires signals of predetermined duration to be transmitted. The invention involves the use of a novel programmable timer to allow pulses or other signals which may, but need not be, locally generated, to be transmitted to an external circuit.

Other features and advantages of the invention will become apparent from the following detailed description taken in conjunction with the drawings which disclose, by way of example, the principles of the invention.

DETAILED DESCRIPTION OF THE PREFERRED EMBODIMENT

Figure 1:
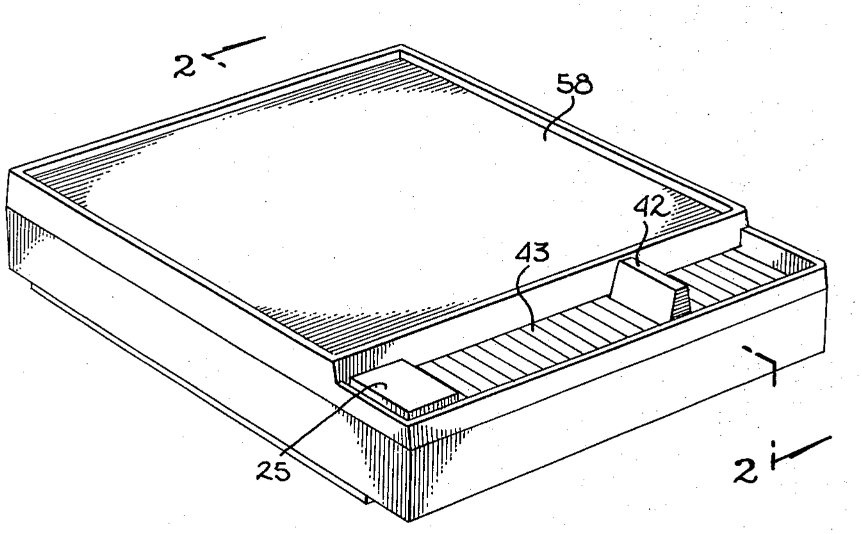
FIG. 1 is a perspective view of the assembled dialer.
Figure 2:
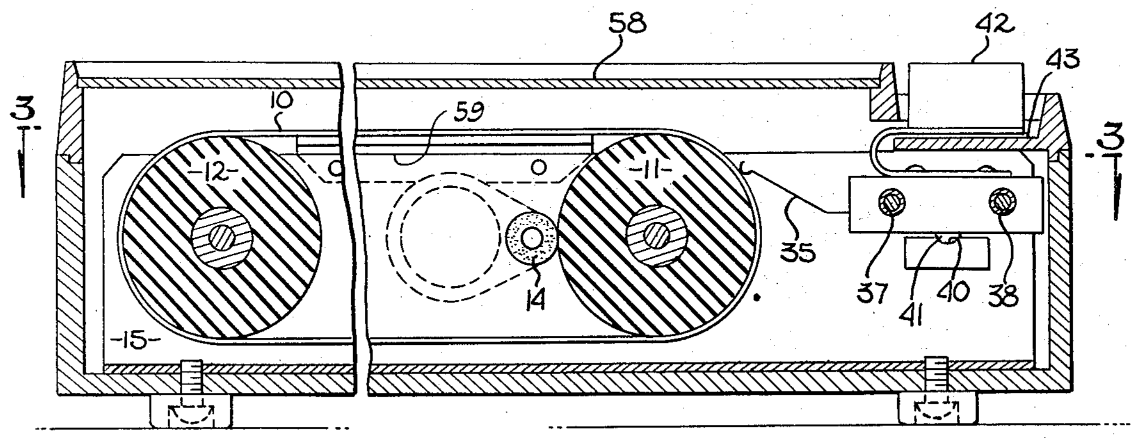
FIG. 2 is a cutaway side view of the mechanism of the dialer.
Figure 3:
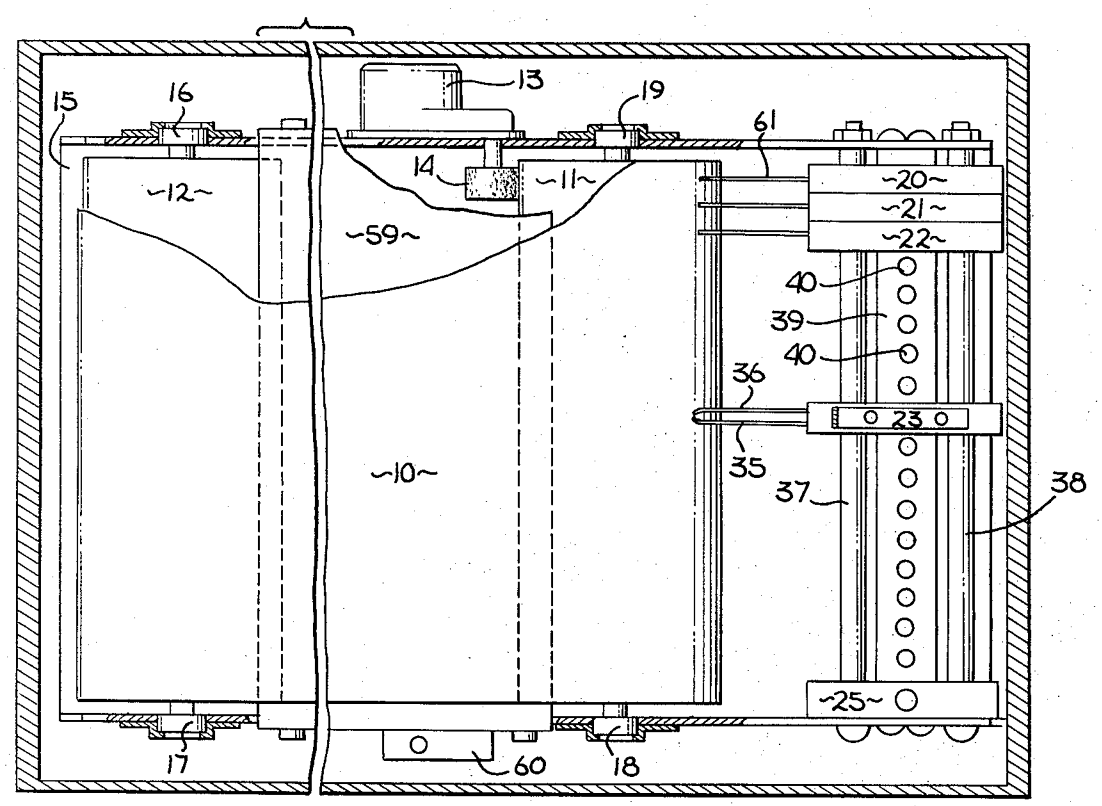
FIG. 3 is a cutaway plan view of the mechanism of the dialer.

The operation of the dialer can be best understood by referring first to FIGS. 2 and 3. A thin flat belt 10 is there shown disposed around drums 11 and 12, the drums being mounted to chassis 15 by means of ball bearings 16, 17, 18 and 19 and thus free to turn. Drum 11 is driven by motor 13 through a friction drive wheel 14. The gearing in motor 13 is preferably such that the surface speed of endless belt 10 is approximately 2 inches per second. This speed is not critical but results in convenient sizes for the belt and the perforations and marks on it which are described later.

Figure 4:
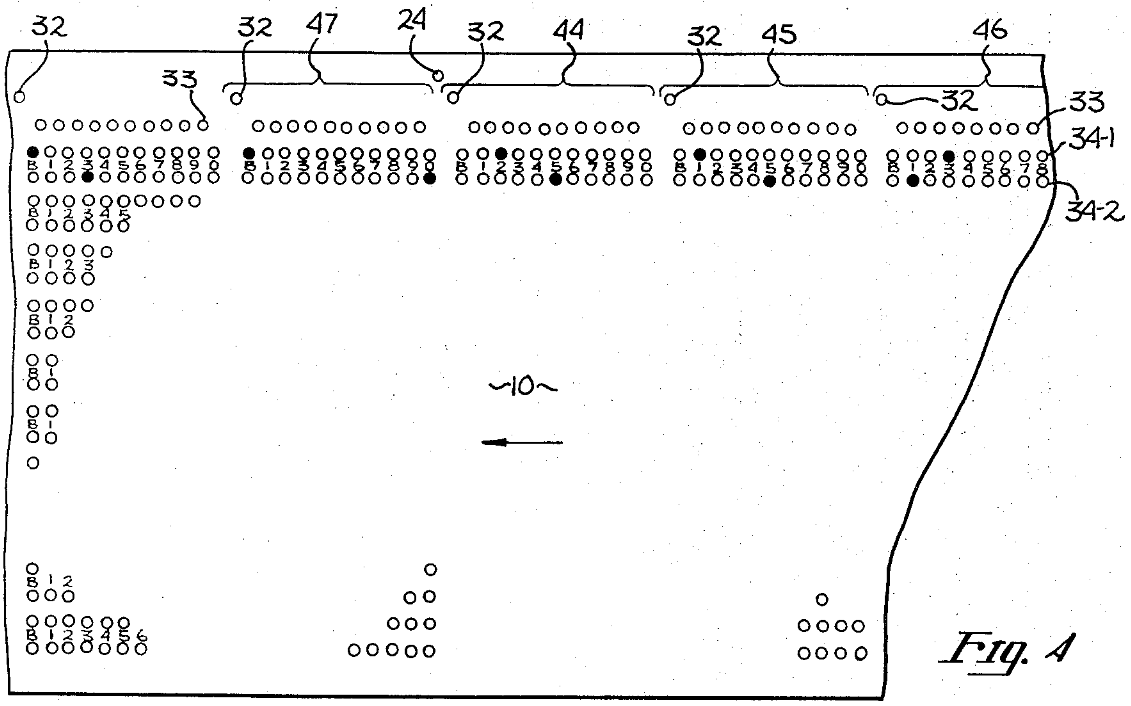
FIG. 4 is a plan view of a section of the programming belt of the dialer.

These perforations and/or marks are not shown in FIGS. 2 and 3 but are indicated in FIG. 4 which is a developed view of a section of belt 10. A row is defined as a sequence of perforations or marks along the length of the belt and a column is a sequence across the belt. As the motor 13 runs, the various rows pass under sensors 20, 21, 22 and 23 which collect the information recorded on belt 10 and the telephone number desired is automatically dialed.

Row 24, as seen in FIG. 4, contains but a single perforation whose purpose is to cause the motor 13 to stop and the apparatus to come to rest after a dialing sequence.

Figure 5:
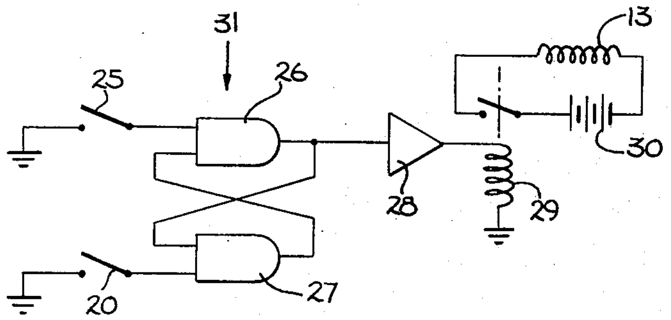
FIG. 5 is an electrical schematic diagram of the motor control circuitry.

An electrical schematic diagram of the motor control circuitry is shown in FIG. 5. The motor control circuit is started by a manually operated momentary contact switch 25 which serves as the "dial" switch. The control circuit also includes the sensor 20 and a bi-stable flip-flop 31 which, in the illustrated embodiment, is composed of OR gates 26 and 27 in a cross coupled circuit configuration well known in the art. The control circuit further includes an amplifier 28, a relay 29, and the motor 13. The power source for flip-flop 31 is conventional and not shown. Flip-flop 31 has two stable states, one of which results in essentially zero input to amplifier 28 and the other of which provides a signal of several volts to anplifier 28. Conventional means, not shown, are provided for assuring that flip-flop 31 assumes the condition of zero input to amplifier 28 when the apparatus is initially turned on.

The motor 13 is started by depressing the "dial" momentary contact switch 25 causing bi-stable flip-flop 31 to assume the condition which causes input to amplifier 28 and closure of relay 29. Motor 13 is thereby energized by a power source, herein battery 30. The motor will continue to run until flip-flop 31 is returned to its initial condition. This occurs when the perforation in row 24 passes under sensor 20.

Sensor 20 is in the form of a switch and includes one or more sensing wires making up a wiper 61 which rides on the belt 10 over the position of row 24. When the perforation in row 24 appears under the wiper 61, the wires contact drum 11 thus momentarily grounding the wiper 61 and closing the switch. This causes flip-flop 31 to change state, relay 29 to open, and motor 13 to coast to a stop.

Row 32 contains a series of perforations, the number depending on the maximum number of digits which are to be dialed, there being one perforation in row 32 associated with each digit to be dialed. Most telephone numbers contain seven digits, but the addition of area codes and other control digits may increase the number required to eleven or more digits. For purposes of illustration, an eleven digit dialer will be described but it will be understood that dialers conforming to this invention can be made with the capacity to dial seven, ten, or any other desired number of digits.

Sensor 21, also in the form of a switch similar to sensor 20, grounds against durm 11 each time a perforation in row 32 passes under it. The relationship of the perforation in row 24 to the perforations in row 32 is such that the belt will come to rest after a dialing sequence just ahead of the position at which sensor 21 contacts drum 11 through the perforation in row 32 associated with the first digit of the dialing sequence (digit 1). During the course of a full cycle of operation, sensor 21 will generate 11 pulses (grounds), one just preceding the dialing of each digit in the sequence. The purpose of these pulses is to reset the dialing circuitry preparatory to the dialing to the next digit. The reset operation will be described later.

Row 33 contains perforations in groups of ten, one group associated with each digit to be dialed. The spacing of the perforations within each group of 10 in such that in operation one will pass under the associated sensor 22, in the form of a switch, approximately each 0.1 second and the spacing between groups is approximately 0.3 seconds. These times are established by the characteristics of the telephone system to which the dialer is connected. The spacing between the group associated with digit 11 and that associated with digit 1 is larger and depends upon how fast the mechanism stops after the dialing cycle. Thus, a full dialing cycle for the eleven digit dialer being described consists of a sequence of 110 pulses generated by the perforations in row 33 spaced 0.1 second apart with 0.3 second spacing between each group of ten.

The pulses generated by the perforations in row 33 and sensor 22 are, after proper wave shaping and selection, the dialing pulses which go to make up each digit. The proper number of pulses to make up the digit to be dialed is selected by control pulses generated by the memory rows, indicated as rows 34–1, 34–2 . . . . 34–n, n being the maximum number of telephone numbers which may be stored in the dialer.

The circles indicated for rows 34 in FIG. 4 are not perforations but are indicia printed on belt 10 using a non-electrically conductive ink. The darkened circles in the rows 34 as shown in FIG. 4 are examples of numbers stored, and are also not perforations but are circles which have been darkened with a pencil which makes an electrically conductive mark. Sensor 23 is associated with the rows 34; and wiper wires 35 and 36 sense the passage of a darkened circle past the sensor.

Sensor 23 is manually moveable along guide rails 37 and 38 by means of handle 42 attached to sensor 23. Located below sensor 23 is a strip 39 which contains a series of detents 40 spaced the same distance apart as are the rows 34. Spring loaded ball 41 cooperates with the detents 40 to locate the sensor 23 so that its wiper wires 35 and 36 will be shorted by the darkened circles in one of the rows 34, as selected. Name strip 43 is located below handle 42 and the name of the person whose number is recorded in the particular row selected can be written on the name strip adjacent to the handle.

Each of the rows 34 is comprised of eleven groups of eleven circles, each group of eleven circles along a row being associated with a digit to be dialed. The intercircle distances in the rows 34 are the same as the interperforation distances in row 33. The circles are spaced along the row such that a circle in row 34 will be presented to sensor 23 just prior to the time a perforation in row 33 is presented to sensor 22.

Each column of circles formed by the rows 34 is associated with a particular number which may be dialed as the digit associated with the group of columns to which that column belongs. These numbers may conveniently be printed on the belt 10, as shown in FIG. 4, between every other row of the rows 34 so as to provide a guide for following a particular row and to facilitate locating a particular circle.

As can be seen in FIG. 4, the first column in each group is labelled "B." If this circle in any particular row is darkened with conductive pencil, no number will be dialed for that digit — that is, that digit will be skipped. If, however, the next circle, labelled "1" is darkened, the number 1 will be dialed for the digit. If the circle labelled "2" is darkened, a 2 will be dialed and so on. Only one circle in each group of eleven should be darkened.

The groups of columns indicated as 44, 45, 46 and 47 in FIG. 4 are the groups associated with the first, second, third and eleventh digits of a dialing sequence. If row 34–1 were selected as the active row by positioning sensor 23 in line with this row, it can be seen that, as the particular belt illustrated in programmed, the numbers 2, 1, 3, and skip will be dialed as the first, second, third and eleventh digits of the number. Similarly, row 34–2 is programmed to dial 551 . . . 0.

Figure 6:
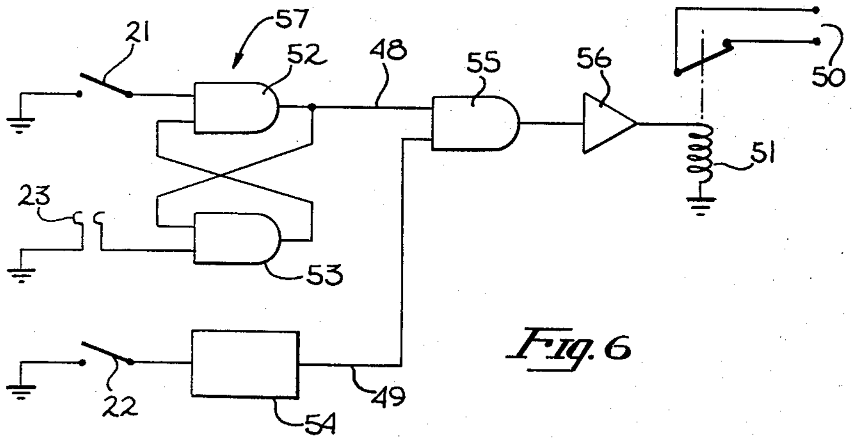
FIG. 6 is an electrical schematic diagram of the dialing pulse circuitry.

The electrical circuitry for creating the dialing pulses required is illustrated in FIG. 6 where two OR gates 52 and 53, conventionally connected as bi-stable flip-flop 57, are shown with inputs derived from sensors 21 and 23. The output of flip-flop 57 is connected to one of the inputs of AND gate 55. Wave shaper 54 converts any contact at sensor 22 into a pulse 0.06 seconds long which is applied to one of the inputs of AND gate 55. Amplifier 56 amplifies any pulses from AND gate 55 and energizes relay 51 which has normally closed contacts in response thereto. The terminals 50 are connected in series with the dialing circuit of the telephone to be dialed; the green wire in standard Bell System telephones. Obviously, the telephone system must be activated by, for example, picking up the handset before attempting to dial a number with the dialer.

Figure 7:
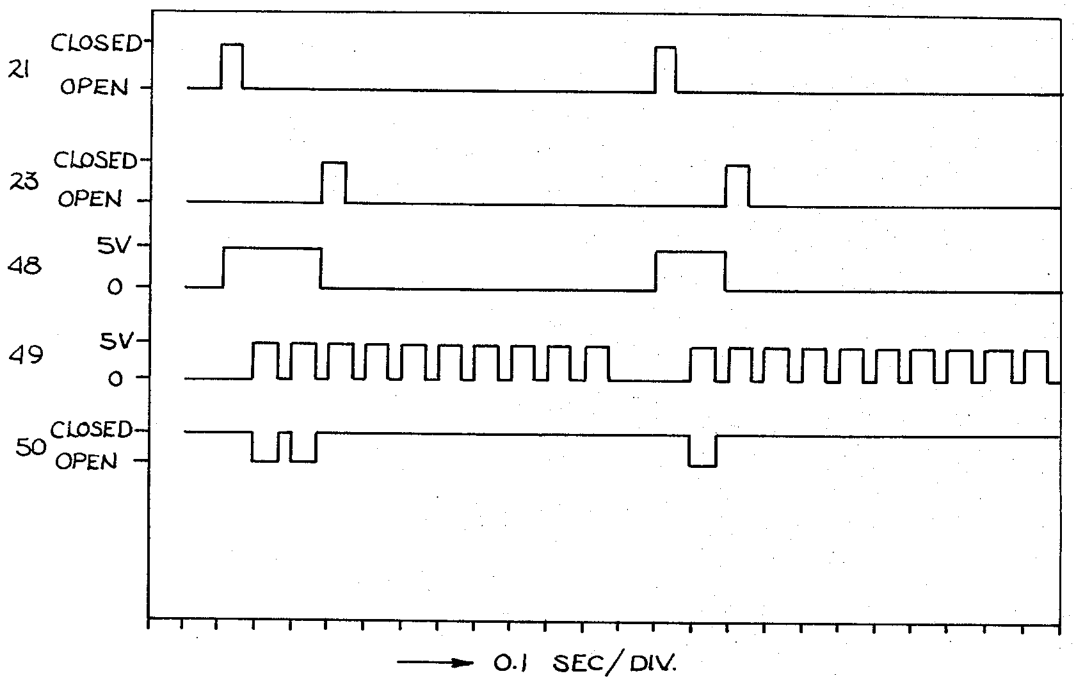
FIG. 7 is a chart of waveforms occurring at several points in the circuit during operations.

FIG. 7 depicts the waveforms at various points in the circuitry as the dialer dials the first two digits of the telephone number in row 34–1 which has, for purposes of illustration, been programmed into the belt 10 illustrated in FIG. 4. The numbers to be dialed are 2 and 1.

Assuming that belt motion has been initiated by depressing switch 25 and flip-flop 57 is in its quiescent condition of low voltage at its output 48, the first event is a closure of sensor 21 caused by the perforation in row 32, group 44, which causes flip-flop 57 to flip to its other stable condition of high voltage (5 volts) output on bus 48. This is shown in FIG. 7 on lines 21 and 48. One-tenth of a second later the train of ten dialing pulses generated by sensor 22 and the perforations in row 33, group 44 begin. These pulses, after being shaped to 0.06 seconds in length and 5 volts in amplitude by wave shaper 54 appear on bus 49. The coincidence of voltage appearing on busses 48 and 49 causes an output from AND gate 55 which energizes relay 51 after having been amplified by amplifier 56. Thus so long as voltage appears on bus 48, the dialing pulses generated at sensor 22 cause an open circuit to appear at terminals 50 for 0.06 seconds per pulse. After two such pulses, the darkened area in row 34–1 causes sensor 23 to short which in turn flips flip-flop 57 back to its quiescent state of no output voltage on bus 48. Since there can no longer be coincidence of voltage on busses 48 and 49, succeeding dialing pulses from sensor 22 do not cause relay 51 to actuate and no further dialing pulses appear until the circuit is reset by the perforation in row 32, group 45. At this time a closed circuit appears at sensor 21 and the digit associated with group 45, row 34–1 is dialed.

The digit dialing sequence is repeated for each group until all eleven digits have been dialed, at which time the perforation in row 24 causes the motor 13 to stop as previously described, and the mechanism comes to rest. In the event that a seven digit number is to be dialed, the "B" circle for each digit from the eighth through the eleventh is darkened which causes flip-flop 57 to reassume its quiescent state before any dialing pulses can be transmitted for that digit.

It is clear that by darkening the appropriate circles in each group along a row 34 an entire telephone number can be programmed into the dialer. If the belt 10 has n rows 34, then n telephone numbers can be programmed.

Figure 8:
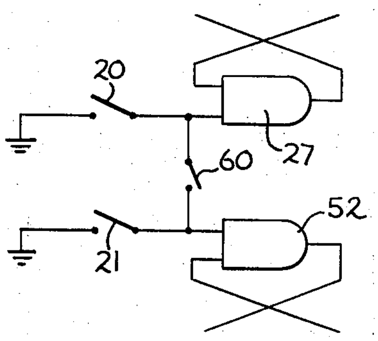
FIG. 8 is an electrical schematic diagram showing a portion of the motor control circuit and dialing pulse circuit showing their interconnection.

Top plate 58, which provides a convenient place for the telephone associated with the dialer to rest, is made to be easily removeable so as to provide access to the belt 10 for programming numbers. Backing plate 59, positioned below belt 10, supports belt 10 as circles or row 34 are darkened during the programming of a number. The belt 10 can be manually moved so as to provide access to the desired area of the belt for programming, or sensor 21 can be switched into the motor control circuit, as shown in FIG. 8, to provide a motorized indexing of the belt. FIG. 8 shows the portion of the motor control circuit of FIG. 5 which includes OR gate 27 and sensor 20 as well as the portion of the dialing circuitry of FIG. 6 which includes OR gate 52 and sensor 21. Switch 60, which can be manually actuated switch or a microswitch which is closed automatically by the removal of cover plate 58, connects sensor 21 into the motor control circuit. When switch 60 is closed, actuation of momentary switch 25 starts the motor as described above but instead of the motor continuing to run until the perforation in row 24 causes sensor 20 to stop the motor, the perforations in row 32 cause the result through sensor 21. Thus each actuation of switch 25 will cause belt 10 to move only the distance corresponding to one digit and by repeatedly actuating switch 25 any desired portion of belt 10 can be made to stop in a position convenient for marking.

The presently preferred embodiment of the invention has been explained, however, it will be clear to those skilled in the art that various adaptations and changes can be made within the spirit of the invention.

A flat flexible programming belt has been illustrated but any body capable of being marked could be used without departing from the spirit of the invention. For example, a drum-shaped body having a circumference large enough to contain the required marks could be used. If such a body were substituted for the belt 10 in the preferred embodiment which has been described, an insulating coating over a conductive drum surface would allow the conductive marks to be made in rows 34 just as with a flexible belt and perforations in the insulating coating would serve the same function as the perforations in the flexible belt. It is meant to include in the term "mark," any area on the surface of the body which has a characteristic which is different from the surrounding area and can be sensed by a suitable sensor. Typical, but not the only, "marks" which are contemplated are: differences in electrical conductivity, perforations, raised areas, differences in color, and differences in magnetic or electrostatic charge. Suitable electrical, pneumatic, optical, mechanical or magnetic sensors can be used to sense the marks as appropriate.

Those skilled in the art will also recognize that while the invention has been described using perforations for generating some of the pulses required and electrically conductive pencil marks for generating other pulses, either method could just as easily have been utilized for generating all of the required pulses. Other means such as optical, pneumatic or magnetic means could have been used to sense the pulse information programmed on the belt for any or all of the pulse generating functions.

The pulses associated with rows 24, 32 and 33 need not be generated by the belt at all but can be achieved by other means such as cam operated switches, etc. operated in synchronism with the motion of the belt 10.

It will also be realized by those skilled in the art that the subcombination which generates the dialing pulses is novel and has application apart from use in connection with the repertory dialer. Systems which require the generation groups of control pulses or other signals can be inexpensively assembled using the pulse control subcombination as an element to generate such groups of pulse signals with the number of pulses or signals in each group being easily programmable and previously described.

Thus, while a particular presently preferred embodiment has been illustrated and described in detail, various modifications may be made without departing from the spirit and scope of the invention. Accordingly, it is not intended that the invention be limited except by the following claims.

I claim:

1. An automatic repertory dialer which comprises:

a. means for sequentially generating a plurality of trains of dialing pulses, b. gating means for coupling said dialing pulses into a dialing circuit, said gating means being controlled by a pair of gating pulses;

c. first pulse generating means for generating a plurality of first gating pulses, one of said first gating pulses occurring immediately prior to the start of each of said trains of dialing pulses, said first gating pulses turning said gating means on whereby dialing pulses from said train of dialing pulses are coupled to said dialing circuit; and d. second pulse generating means for generating a plurality of second gating pulses, there being a second gating pulse generated in the time interval between each of said first gating pulses, said second gating pulses turning said gating means off whereby dialing pulses from said train of dialing pulses which occur subsequent to said second gating pulses are not coupled to said dialing circuit, said second gating pulses occurring at predetermined intervals after said first gating pulses whereby the number of said dialing pulses from each of said trains of dialing pulses to be coupled to said dialing circuit corresponds to a predetermined series of numbers.

2. An automatic repertory dialer as defined in claim 1 and in which said second gating pulses are generated by means which comprises:

a. a flat endless programming belt;
b. a motor driving said belt;
c. one or more rows of pulse recording areas on said belt; and
d. a sensor positionable so as to sense pulses recorded in any of said rows, said sensor generating said second gating pulses in response to the stimuli produced by said recorded pulses in one of said rows, said recorded pulses in each of said rows being spaced in a predetermined manner whereby dialing pulses corresponding to predetermined sequences of numbers to be dialed can be coupled to said dialing circuit.

3. An automatic repertory dialer as defined in claim 1 and in which said second gating pulses are generated by means which comprises:

a. a flat belt made of electrically insulating material;
b. a motor driving said belt;
c. one or more rows of electrically conductive marks on said belt; and
d. a pair of electrical wipers riding on said belt, said wipers being positionable so as to be in alignment with the said marks along any of the said rows of electrically conductive marks, whereby each of said marks passing under said pair of wipers causes a conductive path between said wipers, said conductive path causing a second gating pulse to be generated, said marks in each of said rows being spaced to generate one of said second gating pulses subsequent to each of said first gating pulses, the time intervals between said first gating pulses and said second gating pulses determining the number of said dialing pulses from each of said trains of dialing pulses to be coupled to said dialing circuit whereby a predetermined sequence of numbers will be dialed, each of said rows having the marks in said row spaced to dial a predetermined sequence of numbers whereby a plurality of predetermined numbers can be dialed.

4. An automatic repertory dialer as defined in claim 3 where the means for generating said trains of dialing pulses comprises:

a. a conductive drum, said belt running over the surface of said drum;
b. a first row of perforations in said belt;
c. a first wiper, said first wiper being positioned to contact said drum as the perforations in said first row of perforations pass the position of said first wiper, said trains of dialing pulses being generated by repetitive contacts between said first wiper and said drum;

and the means for generating said first gating pulses comprises:

d. a second row of perforations in said belt; and
e. a second wiper, said second wiper being positioned to contact said drum as the perforations in said second row of perforations pass the position of said second wiper, said first gating pulses being generated by contacts between said second wiper and said drum, said perforations in said second row of perforations being spaced along said second row whereby one of said first gating pulses is generated prior to the generation of each of said trains of dialing pulses.

5. Control means responsive to marks on a body comprising:

a. a body of markable material;
b. a mark on said body;
c. means for moving said body;
d. means for generating signals in synchronism with the movement of said body whereby the total number of said signals generated is a function of the distance said body moves;
e. switching means controlling the coupling of said signals to an external circuit; and
f. means for switching said switching means on when said body is in a first predetermined position and off when said body is in a second predetermined position, said second predetermined position being a function of the position of said mark on said body, whereby the number of said signals which are coupled to said external circuit is determined by the position of said mark on said body, and wherein said means for switching said switching means on and off includes a sensor for sensing said mark on said body, said mark being electrically conductive and said sensor sensing changes in the surface conductivity of said body.

6. A pulse generator comprising:

a. a body of markable material;
b. a sensor for sensing marks on said body;
c. means for moving said body past said sensor whereby said sensor will sense marks on said sheet of markable material;
d. means for generating electrical pulses in synchronism with the movement of said body, the total number of said pulses generated being proportional to the distance said body moves;
e. a flip-flop having two stable states;
f. means for switching said flip-flop into the first of said two stable states, said switching occurring when a first predetermined point on said body passes said sensor;
g. a mark on said body, said mark being placed at a second predetermined point on said body whereby said mark will be sensed by said sensor, said sensor being coupled to said flip-flop whereby said flip-flop is switched into the second of said two stable states by the sensing of said mark by said sensor; and
h. an AND gate having two inputs, the first of said inputs being coupled to said flip-flop and the second of said inputs being coupled to said means for generating electrical pulses whereby said electrical pulses will be coupled through said AND gate when said flip-flop is in said first of said two stable states, the number of said electrical pulses being coupled through said AND gate being determined by the distance on said body between said two predetermined points.

7. A pulse generator as defined in claim 6 where said mark is electrically conductive and said sensor senses a change in the surface conductivity of said body.

8. A pulse control element responsive to marks on a body, comprising:

a. a body of markable material;
b. a mark on said body;
c. means for moving said body;
d. means for generating pulses in synchronism with the movement of said body whereby the total number of pulses generated is a function of the distance said body moves;
e. a gate for controlling the coupling of said pulses to an external circuit; and
f. means for switching said gate on when said body is in a first predetermined position and off when said body is in a second predetermined position, said second predetermined position being a function of the position of said mark on said body whereby the number of said pulses which are coupled to said external circuit is determined by the position of said mark on said body.

9. Control means responsive to marks on a body comprising:

a. a body of markable material;
b. a mark on said body;
c. means for moving said body;
d. means for generating signals in synchronism with the movement of said body whereby the total number of said signals generated is a function of the distance said body moves;
e. switching means controlling the coupling of said signals to an external circuit; and
f. means for switching said switching means on when said body is in a first predetermined position and off when said body is in a second predetermined position, said second predetermined position being a function of the position of said mark on said body whereby the number of said signals which are coupled to said external circuit is determined by the position of said mark on said body, said means for switching said switching means on and off including
   a sensor for sensing said mark on said body, said mark being electrically conductive and said sensor sensing changes in the surface conductivity of said body, and
   a flip-flop having two stable states, said signals being coupled to said external circuit when said flip-flop is in the first of said stable states and said signals not being coupled to said external circuit when said flip-flop is in the second of said stable states, said flip-flop being switched into said second stable state by the sensing of said mark by said sensor.

10. An automatic telephone dialer for actuating a telephone dialing circuit, said telephone dialer comprising:

a generally flexible, elongated band of electrically non-conductive material, having a substantial width and mounted for longitudinal movement over a plurality of rollers, said band having a capacity to store a plurality of telephone numbers with various numbers of digits in the form of a plurality of erasable marks of an electrically conductive material, said marks being positioned in a plurality of longitudinally aligned sets spaced across the width of said band, each of said sets being representative of one of said telephone numbers and said marks in said sets being spaced longitudinally to represent said digits in the telephone numbers;

sensing means for detecting said marks on said band;

drive means for moving said band longitudinally at a constant speed with respect to said sensing means;

means for selecting a particular one of said telephone numbers by moving said sensing means transversely across the width of said band to align said sensing means with a corresponding set of said marks;

first switch means manually operable to actuate said drive means and thereby to initiate a dialing operation;

pulse generation means including second switch means operable to be periodically closed by a plurality of perforations equally spaced longitudinally along said drive band, to produce a continuous train of pulses at a frequency selected to be effective in actuating the dialing circuit;

third switch means operable by an additional plurality of perforations in said band to produce starting pulses to initiate automatic dialing of each of said digits in the selected telephone number;

first gating means coupled with said third switch means and responsive to said starting pulses, for connecting said pulses generator means to the dialing circuit to initiate automatic dialing of each of said digits in the selected telephone number;

second gating means coupled with said sensing means, and therefore responsive to the positions of said erasable marks, for disconnecting said pulse generation means from the dialing circuit after numbers of pulses corresponding to said digits in the selected telephone number have been generated; and fourth switch means automatically operable to deactivate said drive means on completion of the dialing operation.

11. Control means responsive to marks on a body, comprising:

a. a body of markable material;
b. an electrically conductive mark on said body;
c. means for moving said body;
d. circuit means having two stable states;
e. means responsive to the position of said body, for establishing said circuit means in the first of said two stable states;
f. a sensor for sensing said electrically conductive mark, said sensor causing said circuit means to switch to the second of said two stable states upon the sensing of said conductive mark by said sensor; and
g. gating means, said gating means being capable of transmitting signals when said circuit means is in the first of said two stable states.

12. An automatic repertory dialer for actuating the dialing circuit of a telephone, said automatic dialer comprising:

memory means with at least one recording surface on which a plurality of digits can be encoded;

sensing means for sensing a selected set of digits encoded on said recording surface;

drive means for producing relative movement between said memory means and said sensing means;

means connectable to the dialing circuit of a telephone for generating a sequence of dialing pulses at a rate selected to be effective in actuating the dialing circuit;

means responsive to said sensed selected set of digits encoded on said recording surface for enabling and disabling said means for generating a sequence of dialing pulses, and for thereby producing a set of trains of said dialing pulses with the numbers of pulses in said trains corresponding to the digits in said sensed selected set;

switch means for starting said drive means and thereby generating said set of trains of said dialing pulses; and switch means for automatically stopping said drive means thereafter.

13. An automatic repertory dialer for actuating the dialing circuit of a telephone, said automatic dialer comprising:

memory means with at least one recording surface on which a plurality of digits can be encoded;

sensing means for sensing a selected set of digits encoded on said recording surface;

drive means for producing relative movement between said memory means and said sensing means;

means connectable to the dialing circuit of a telephone for generating a sequence of dialing pulses at a rate selected to be effective in actuating the dialing circuit; and means responsive to said sensed selected set of digits encoded on said recording surface for enabling and disabling said means for generating a sequence of dialing pulses, and for thereby producing a set of trains of said dialing pulses with the numbers of pulses in said trains corresponding to the digits in said sensed selected set, including first gating means operable to start each of said trains of said dialing pulses, and second gating means operable to stop said trains of said dialing pulses according to corresponding values of the digits in said selected set of digits.

14. An automatic telephone dialer for actuating the dialing circuit of a telephone, said telephone dialer comprising:

a coding band having a capacity to store a plurality of telephone numbers with various numbers of digits in the form of a plurality of aligned and spaced erasable marks, said marks having an electrical conductivity different from that of said band and each of said marks being positioned on said band to indicate a particular digit of a telephone number;

sensing means movable to select a particular one of said stored telephone numbers and for detecting said digits in the selected number;

drive means for moving said coding band at a constant speed with respect to said sensing means; and means coupled with said sensing means and connectable to the dialing circuit of a telephone, for converting said digits detected by said sensing means into corresponding numbers of electrical pulses for actuating the dialing circuit of the telephone, including pulse generation means, first gating means for connecting said pulse generation means with the dialing circuit to start dialing a digit, and second gating means responsive to the positions of said erasable marks, for disconnecting said pulse generation means for the dialing circuit after a number of pulses corresponding to the particular digit have been generated.

15. A telephone dialer as set forth in claim 14, wherein:

said pulse generation means includes electrical contact means; and said band includes a plurality of perforations spaced to cooperate with said electrical contact means in generating the pulses.

16. An automatic telephone dialer for actuating the dialing circuit of a telephone, said telephone dialer comprising:

a coding band having a capacity to store a plurality of telephone numbers with various numbers of digits in the form of a plurality of aligned and spaced erasable marks, said marks having an electrical conductivity different from that of said band and each of said marks being positioned on said band to indicate a particular digit of a telephone number;

sensing means movable to select a particular one of said stored telephone numbers and for detecting said digits in the selected number;

drive means for moving said coding band at a constant speed with respect to said sensing means;

means coupled with said sensing means and connectable to the dialing circuit of a telephone, for converting said digits detected by said sensing means into corresponding numbers of electrical pulses for actuating the dialing circuit of the telephone;

means for starting said drive means to initiate automatic dialing, and automatically stopping said drive means after completion of the dialing operation; and manually operable switch means for selectively actuating said drive means to move said band a selected distance thereby to facilitate marking and erasing numbers on said band.

* * * * *